United States Patent [19]

Lane et al.

[11] Patent Number: 5,016,447
[45] Date of Patent: May 21, 1991

[54] OIL RETURN FOR A TWO-STAGE COMPRESSOR HAVING INTERSTAGE COOLING

[75] Inventors: L. Thomas Lane; Bruce A. Fraser, both of Manlius; Thomas E. Brendel, Fayetteville, all of N.Y.

[73] Assignee: Carrier Corporation, Syracuse, N.Y.

[21] Appl. No.: 517,777

[22] Filed: May 2, 1990

[51] Int. Cl.[5] .......................................... F25B 43/02
[52] U.S. Cl. ........................................ 62/470; 62/473
[58] Field of Search ................. 62/510, 470, 473, 468

[56] References Cited

U.S. PATENT DOCUMENTS 1,471,732 10/1923 Horne .................................... 62/510
4,745,777 5/1988 Morishita et al. ..................... 62/510

Primary Examiner—Henry A. Bennett
Assistant Examiner—John Sollecito
Attorney, Agent, or Firm—Frederick A. Goettel, Jr.

[57] ABSTRACT

An internally compounded two-stage compressor has an interstage cooler and an oil separator associated therewith. The oil, and any hot gas mixed with it, discharged from the oil separator is passed in heat exchanger relationship with the cooling refrigerant flowing into the interstage cooler.

4 Claims, 1 Drawing Sheet

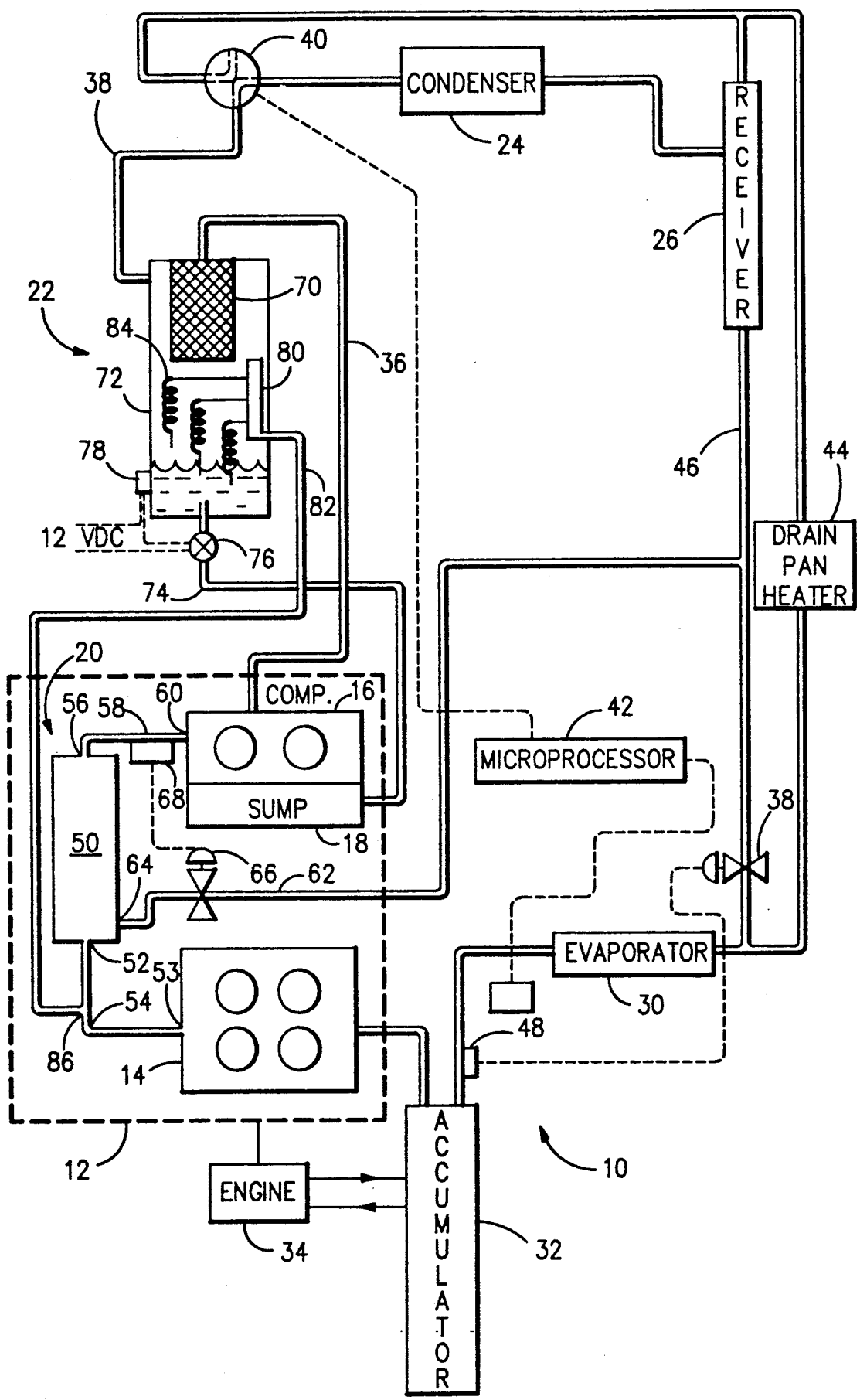

OIL RETURN FOR A TWO-STAGE COMPRESSOR HAVING INTERSTAGE COOLING

BACKGROUND OF THE INVENTION

1. Field of the Invention

This invention relates to refrigeration systems having internally compounded two-stage compressors having interstage cooling. More specifically, it relates to an oil return system for such a compressor, which has an oil separator associated therewith.

2. Description of the Prior Art

Low evaporator temperatures are encountered in many industrial refrigeration applications. In such applications it is often found that two-stage rather than single stage compression is advantages, either to achieve greater economy or to avoid excessive compression ratios and compressor discharge temperatures. In a typical two-stage reciprocating compressor system the discharge gas from the low pressure stage of the compressor is normally very highly superheated and is too hot for the suction of the high pressure stage of the compressor. An interstage cooling system sometimes referred to as a de-superheater, in commonly used to reduce the gas temperture so that the discharge from the high pressure stage of the compressor is not excessively high.

Lubricating oil is continuously carried into the high pressure stage discharge line along with high pressure, high temperature gaseous refrigerant. An oil separator is commonly installed after the high stage compressor to receive the oil and refrigerant mixture and separate the oil from the gas.

It is also common practice when using an integral two-stage compressor to maintain the crankcase at the intermediate stage pressure. Common design practice is also to return the oil from the oil separator to the crankcase.

With certain oil separator systems, particularly those having a minimal number of moving parts and adapted for use in transport refrigeration systems, the oil return discharge line to the crankcase may in some cases contain hot discharge gas. The hot discharge gas may, in some circumstances, raise the temperature and pressure of the crankcase to a level above the intermediate stage pressure. This condition is not desirable.

SUMMARY OF THE INVENTION

It is an object of the present invention to pass the oil, and any gas mixed therewith, from an oil separator, into heat exchange relation with the interstage cooler of a two stage compressor.

It is another object of the present invention to mix the oil and refrigerant gas passing from an oil separator with the flow of refrigerant through the interstage cooler of a two-stage compressor.

These, and other objects, as will become apparent hereinafter are accomplished by the present invention.

A refrigeration system includes a compressor, a condenser, an expansion device and an evaporator all serially interconnected to form a closed refrigeration circuit. The compressor includes a low and high pressure stage, both having an inlet and outlet associated therewith. The compressor is of the type lubricated with a lubricating oil which mixes with the refrigerant being circulated in the system. The outlet of the high pressure stage of the compressor discharge a mixture of compressed refrigerant and lubricating oil. The refrigerant flowing from low pressure stage to the high pressure stage of the compressor is cooled by passing it through an interstage cooling means. An oil separator is provided for receiving the mixture of compressed refrigerant and lubricating oil from the outlet of the high pressure stage and for substantially separating the oil from the mixture. The separated oil and any refrigerant gas not separated therefrom are metered to and mixed with the refrigerant flowing through the interstage cooling means.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawing. The single drawing FIGURE is a schematic diagram of a refrigeration system utilizing the oil return system of the present invention.

DESCRIPTION OF THE PREFERRED EMBODIMENTS

In the drawing FIGURE, reference numeral 10 generally designates a compression refrigeration system of the type used in transport refrigeration applications. The system includes a reciprocating compressor 12 having a first stage 14 and a second stage 16. As illustrated, the first stage 14 has four cylinders and the second stage 16 has two cylinders. While the compressor stages 14 and 16 are shown separately in the schematic drawing, it should be appreciated that, in an integral two stage reciprocating compressor, the stages share a single compressor block. They also share a reservoir of lubricating oil which is maintained in a crankcase or sump 18 which is shown in the drawing figures as associated with the second compressor stage 16. The compressor 12 is in a refrigeration circuit which serially includes the first stage 14, an interstage cooler 20, second stage 16, oil separator 22, condenser 24, receiver 26, thermostatic expansion valve 28, evaporator 30, and accumulator 32.

The compressor 12 is driven by an internal combustion engine 34, whose cooling system is in heat exchange relationship with the accumulator 32. The operation of the refrigeration circuit is conventional and will be briefly described before a more detailed description of the interaction between the oil separation system and the interstage cooling system is given.

When the compressor 12 is driven by the engine 34, it compresses the refrigerant in the system, thereby raising its temperature and pressure, and forces compressed refrigerant, along with a quantity of lubricating oil intermixed therewith, through a discharge line 36 from the second stage 16 of the compressor. The discharge line 36 conducts the mixture to the oil separator 22, where the hot refrigerant gas and oil are separated from one another. Within the separator 22, the oil is collected and returned to the compressor sump 18 via the oil return system, which will be described below.

The hot, substantially oil free, gaseous refrigerant passes from the oil separator 22 through separator discharge line 38 to a three way valve 40 which is controlled by a microprocessor controller 42. In the refrigeration mode of operation, the valve 40 directs the refrigerant flow to the condenser 24. When in the heating mode of operation and in the defrost mode, the valve 40 directs the flow of hot refrigerant to the receiver 26, the drain pan heater 44 and to the evaporator 30.

In the refrigeration mode, the hot high pressure refrigerant gas applied to the condenser 24, condenses and passes to the receiver 26. Most of the flow from the receiver 26, passes via line 46 to the main thermostatic expansion valve 28 which is controlled by a remote temperature sensing bulb 48 which is located at the downstream side of the evaporator 30. The liquid refrigerant passing through the thermostatic expansion valve 28 is partially flashed and dropped in pressure before reaching the evaporator 30 where the remaining liquid refrigerant evaporates and the gaseous refrigerant is supplied to the accumulator 32 and thence to the first stage 14 of the compressor 12 to complete the cycle.

The interstage cooler 20 shown in the drawing is of the type known as a direct injection of spray type wherein the interstage cooling takes place by injecting a portion of the liquid refrigerant from the receiver directly into the interstage gas cooler 20. The cooler 20 comprises an interstage cooling chamber 50 having an inlet 52 for receiving refrigerant via a cooler inlet refrigerant line 54 from the outlet 53 of the first compressor stage 14. The outlet 56 of the stage cooling chamber 50 conducts the refrigerant gas cooled therein via refrigerant line 58 to the inlet 60 of the second stage 16 of the compressor.

A high pressure liquid line 62 conducts refrigerant from the line 46 interconnecting the receiver 26 and the main thermostatic expansion valve 28 to an inlet 64 to the interstage cooling chamber 50. The flow of refrigerant to the interstage cooling chamber through the line 62 is controlled by a thermostatic expansion valve 66 which is controlled by a temperature bulb 68 which is attached to the refrigerant line 58 leading to the second stage compressor inlet 60. The thermostatic expansion valve 66 and remote bulb 68 cooperate to control the superheat of the gas passing from the interstage cooler 20 to a desired level.

The oil separator 22 is of a type specially designed for use in transport refrigeration applications and has a minimal number of moving parts thereby enabling it to withstand the shock and vibration which such systems experience when they are in use on the road. This oil separator forms the subject matter of a separate United States patent application, commonly assigned with the present application, and filed on even date with the present application.

As previously described the oil separator 22 has a refrigerant/oil inlet line 36 and a refrigerant exit line associated therewith. The mixture of hot refrigerant gas and oil discharged from the compressor 20 is delivered through the refrigerant line 36 to an oil separation device 70 within the separator 22. The separated oil forms droplets and falls under the influence of gravity to the bottom of the separator where it is collected in an oil reservoir 72. The oil reservoir 72 is configured such that the level of oil stored therein varies over a range of depths.

The oil separator 22 has two oil return systems associated therewith. The first system is designed to return oil from the reservoir when the oil viscosity within the reservoir is much too high to flow through the normal oil return system to be described below. The oil viscosity is at such elevated levels, for example, during cold start-ups, especially in cold ambient temperatures.

The high viscosity oil return system comprises an oil return line 74 which interconnects the oil separator reservoir with the compressor oil sump 18. A normally closed solenoid valve 76, which is controled by a thermostat 78, which senses oil temperature is located within the oil return line. The thermostat is located on the outside of the oil separator and is designed to interrupt a 12 volt DC power supply when the sensor temperature exceeds a predetermined level. Accordingly, when the reservoir and the oil contained therein are below a predetermined temperature, the valve 76 will be open and thereby allow oil to freely flow to the compressor sump 18 through the return line 74. When the oil warms up to the point where viscosity is low enough to flow through the normal oil return system, the thermostat 78 will interrupt power to the valve 76. The normally closed valve will then close and remain closed during normal system operation.

The normal oil return system includes an oil collection manifold 80 within the separator. The lower end of the manifold 80 passes through the wall of the separator where it is coupled to the normal oil return line 82.

Communicating with the manifold 80 are a plurality of capillary tubes 84 which serve as oil pick up devices. Each of the capillary tubes functions to pick up oil from the reservoir and conducts the oil picked up thereby to the manifold 80. The lower ends of the capillary tubes comprise open ends which define oil pick up openings and are positioned at different levels within the oil reservoir 72.

When the lower end of a particular capillary tube 72 is immersed in refrigerant oil, the capillary tube readily allows the passage of oil therethrough and into the manifold 80. However, as the level of oil within the reservoir varies, the open end of one or more of the capillary tubes may not be immersed in refrigerant oil and as a result will be exposed to the refrigerant gas which occupies the remaining volume of the oil separator. One of the characteristics of capillary tubes is that a liquid passed therethrough much more readily than a vapor. As a result the capillary tube ends exposed to refrigerant gas will not freely receive and pass refrigerant gas therethrough.

The arrangement as shown in the drawings accordingly will provide a variable rate of oil return from the oil separator to the compressor sump 18.

Under certain operating conditions, the capillary tubes 84 may not totally exclude the passage of hot refrigerant discharge gas therein. As a result, it is possible, under certain conditions, that hot gas will enter the manifold 80 and pass into the oil return line 82.

As was pointed out hereinabove, duing normal two stage compressor operation, the sump is maintained at the intermediate stage pressure. Common practice also is to return oil from the oil separator to the sump.

Under the conditions described above, return of refrigerant oil containing hot discharge gas to the compressor sump 18 is not acceptable. The hot gas will raise the temperature and pressure of the sump, possibly above the intermediate stage pressure, a condition which is not acceptable for safe, reliable operation.

Referring now back to the drawing, it will be seen that the oil return line 82 for the normal oil return system will conduct the oil and any hot refrigerant gas picked up by the system to a location 86 upstream of the interstage cooler 20. The oil return line 82 will inject the oil and gas, from the separator, into the refrigerant line 54, which conducts gas from the first stage 14 of the compressor to the interstage cooler 20. As a result, the oil and gas mixture will blow through the interstage cooler chamber 50 and mix with the cooling liquid refrigerant being injected therein to thereby cool the returing oil and any hot gas contained therewith. The thus cooled hot gas will pass into the second stage 16 of the compressor for compression and continued circulation through the system. The oil will return to the sump 18 through oil return check valves (not shown) in the intake manifold to the second stage 16 and to the sump 18 as is conventional in single stage compressors.

What is claimed is:

1. A refrigeration system comprising:
   a compressor, a condenser, an expansion device and an evaporator serially interconnected to form a closed refrigeration circulation path, said compressor including;
   a low pressure stage having an inlet and outlet, and a high pressure stage having an inlet and an outlet, said compressor being lubricated with lubricating oil which mixes with the refrigerant being compressed therein, said outlet of said high pressure stage discharging compressed refrigerant mixed with lubricating oil;
   interstage cooling means for cooling the refrigerant flowing from said outlet of said low pressure stage to said inlet of said high pressure stage;
   means for receiving the mixture of compressed refrigerant and lubricating oil discharged from said outlet of said high pressure stage and for substantially separating the oil from said mixture; and
   means for conducting the separated oil to said interstage cooling means and for mixing the oil with the refrigerant flowing through said interstage cooling means.

2. The apparatus of claim 1 wherein said interstage cooling means include:
   an interstage cooling chamber in fluid flow communication with said outlet of said low pressure stage of said compressor of said inlet of said high pressure stage of said compressor; and
   means for conducting a portion of the refrigerant passing from said condenser and for expanding said portion of said refrigerant; and
   means for establishing a heat exchange relationship between the expanded refrigerant and the refrigerant flowing through said interstage cooling chamber.

3. The apparatus of claim 2 wherein said means for establishing heat exchange relationship includes means for injecting the portion of expanded refrigerant directly into said interstage cooling chamber.

4. The apparatus of claim 3 wherein said means conducting and mixing the separated oil into said interstage cooling means comprises means for injecting the oil into said interstage cooling chamber upstream of said means for injecting the portion of expanded refrigerant into said interstage cooling chamber.

* * * * *